United States Patent
Otosaka

(10) Patent No.: US 10,526,236 B2
(45) Date of Patent: Jan. 7, 2020

(54) BURNER FOR SYNTHESIZATION

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 16/147,886

(22) Filed: Oct. 1, 2018

(65) Prior Publication Data

US 2019/0112217 A1  Apr. 18, 2019

(30) Foreign Application Priority Data

Oct. 13, 2017  (JP) .................................. 2017-199671

(51) Int. Cl.
*C03B 37/018* (2006.01)
*C03B 37/083* (2006.01)
*C03B 37/085* (2006.01)

(52) U.S. Cl.
CPC ...... *C03B 37/01815* (2013.01); *C03B 37/083* (2013.01); *C03B 37/085* (2013.01);
(Continued)

(58) Field of Classification Search
CPC ............ C03B 37/01815; C03B 37/083; C03B 37/085; C03B 2207/26; C03B 2207/02;
(Continued)

(56) References Cited

U.S. PATENT DOCUMENTS

| 4,136,828 A | * | 1/1979 | Anderson | ........... C03B 19/1423 |
| | | | | 239/422 |
| 6,126,438 A | * | 10/2000 | Joshi | ....................... F23C 7/002 |
| | | | | 110/336 |

(Continued)

FOREIGN PATENT DOCUMENTS

| JP | 3-112820 A | * | 5/1991 | ............... C03B 8/04 |
| JP | 9-188522 A | * | 7/1997 | ............... C03B 8/04 |

(Continued)

OTHER PUBLICATIONS

JP2009137769 abstract, Burner for deposition of base-material for optical fiber, has several combustible-gas ejection ports and combustion aid property gas emission ports, which are arranged in parallel with each other, Jun. 25, 2009. (Year: 2009).*

(Continued)

*Primary Examiner* — Queenie S Dehghan

(57) ABSTRACT

A burner for synthesization to synthesize glass particles that form a porous glass base material is provided, the burner for synthesization including a raw material gas injection portion to inject raw material gas toward a target, a combustion assisting gas injection portion to inject combustion assisting gas in a direction in which the combustion assisting gas is merged with the raw material gas at a first merging point, and a combustible gas injection portion to inject combustible gas in a direction in which the combustible gas is merged with the combustion assisting gas at a second merging point that is positioned closer to the combustion assisting gas injection portion than the first merging point. In the above-described burner for synthesization, the combustion assisting gas injection portion may also include a plurality of injection ports arranged along one straight line.

15 Claims, 8 Drawing Sheets

(52) U.S. Cl.
CPC ...... *C03B 2207/26* (2013.01); *C03B 2207/30* (2013.01); *C03B 2207/38* (2013.01); *C03B 2207/52* (2013.01)

(58) Field of Classification Search
CPC ............ C03B 2207/30; C03B 2207/52; C03B 2207/38
See application file for complete search history.

(56) References Cited

U.S. PATENT DOCUMENTS

| | | | | |
|---|---|---|---|---|
| 2004/0182114 | A1* | 9/2004 | Ooishi | C03B 37/01413 65/413 |
| 2005/0132749 | A1* | 6/2005 | Otsuka | C03B 19/1423 65/17.4 |
| 2013/0091900 | A1* | 4/2013 | Yoshida | C03B 37/0142 65/421 |

FOREIGN PATENT DOCUMENTS

| | | | | | |
|---|---|---|---|---|---|
| JP | 2005043002 | A | * | 2/2005 | ......... C03B 37/0142 |
| JP | 2008074651 | A | * | 4/2008 | ......... C03B 19/1423 |
| JP | 2009137769 | A | * | 6/2009 | ......... C03B 37/0142 |
| JP | 4814205 | B2 | | 11/2011 | |

OTHER PUBLICATIONS

Office Action issued for counterpart Japanese Application No. 2017-199671, issued by the Japan Patent Office on Apr. 2, 2019(drafted on Mar. 26, 2019).

* cited by examiner

BURNER FOR SYNTHESIZATION

The contents of the following Japanese patent application are incorporated herein by reference:
NO. 2017-199671 filed on Oct. 13, 2017.

BACKGROUND

1. Technical Field

The present invention relates to a burner for synthesization.

2. Related Art

For example, as described in Japanese Patent No. 4814205, there is a technology for improving deposition efficiency of glass particles by using a burner for synthesization, which includes a plurality of slit-like ports, when manufacturing a porous glass base material.

If using a burner for synthesization that injects a plurality of types of gas flows in parallel, an injection direction of flame was not stable and the mixed gas was nonuniform. For this reason, thermal stress may be generated, an adhesion rate of the glass particles may become nonuniform, and density of the adhered porous glass base material may become nonuniform. Also, cracks of the porous glass base material may occur.

SUMMARY

According to one aspect of the present invention, a burner for synthesization to synthesize glass particles that form a porous glass base material is provided, the burner for synthesization including a raw material gas injection portion to inject raw material gas toward a target, a combustion assisting gas injection portion to inject combustion assisting gas in a direction in which the combustion assisting gas is merged with the raw material gas at a first merging point, and a combustible gas injection portion to inject combustible gas in a direction in which the combustible gas is merged with the combustion assisting gas at a second merging point that is positioned closer to the combustion assisting gas injection portion than the first merging point.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

As a method of manufacturing a quartz glass base material such as a glass base material for an optical fiber, there are a Modified Chemical Vapor Deposition (VAD) method, an Outside Vapor Deposition (OVD) method and the like. For example, in the OVD method, a glass rod including part of a core and a clad is taken as a target, and fine particles of a glass material that is to be the clad are sprayed on an outer periphery of the target to be taken as the porous glass base material. The formed porous glass base material is dehydrated and becomes transparent by a heating furnace, and becomes the glass base material.

The glass particles to be deposited on the target by the above-described process are synthesized by using the burner for synthesization. The burner for synthesization blows silicon tetrachloride, octamethylcyclotetrasiloxane and the like, which are the glass raw material, into flame such as oxyhydrogen flame to synthesize the glass particles.

Figure 1:
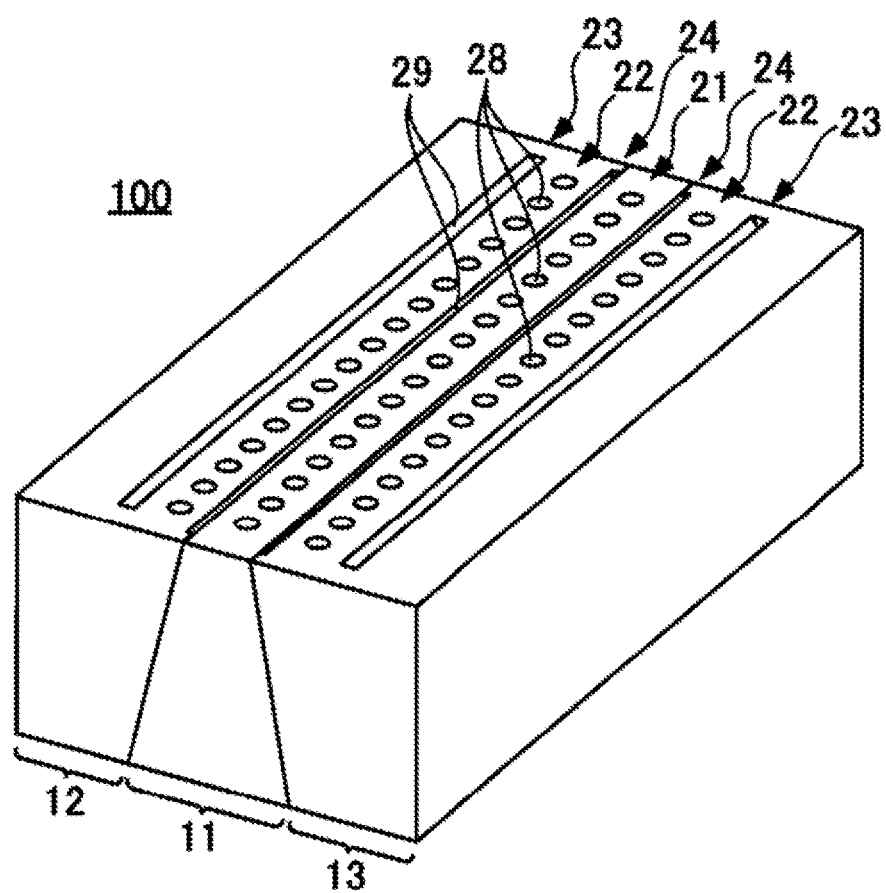
FIG. 1 shows a perspective view of a burner for synthesization 100.

FIG. 1 is a perspective view of a burner for synthesization 100 that synthesizes glass particles and deposits the same on a target when manufacturing a porous glass base material. The burner for synthesization 100 includes a single center block 11 and a pair of side blocks 12, 13.

Each of the center block 11 and the side blocks 12, 13 is a bulk member machined by cutting work and the like, and for example, is formed of quartz. In the illustrated burner for synthesization 100, the pair of side blocks 12, 13 are joined by sandwiching the center block 11 to form a rectangular parallelepiped as a whole. In an upper surface in the drawing of the burner for synthesization 100, gas injection ports 28, 29 of a raw material gas injection portion 21, combustion assisting gas injection portions 22, combustible gas injection portions 23 and seal gas injection portions 24 are opened.

In the burner for synthesization 100, the raw material gas injection portion 21 injects raw material gas such as silicon tetrachloride gas that is to be the raw material of the glass particles to be the porous glass base material. The combustion assisting gas injection portions 22 inject combustion assisting gas such as oxygen gas. The combustible gas injection portions 23 inject combustible gas such as hydrogen gas.

The seal gas injection portions 24 inject inert gas such as nitrogen gas or argon gas, or the air and the like. Accordingly, the glass particles generated by the reaction of the raw material gas in the vicinity of the burner can be prevented from being adhered to the burner for synthesization 100.

Figure 2:
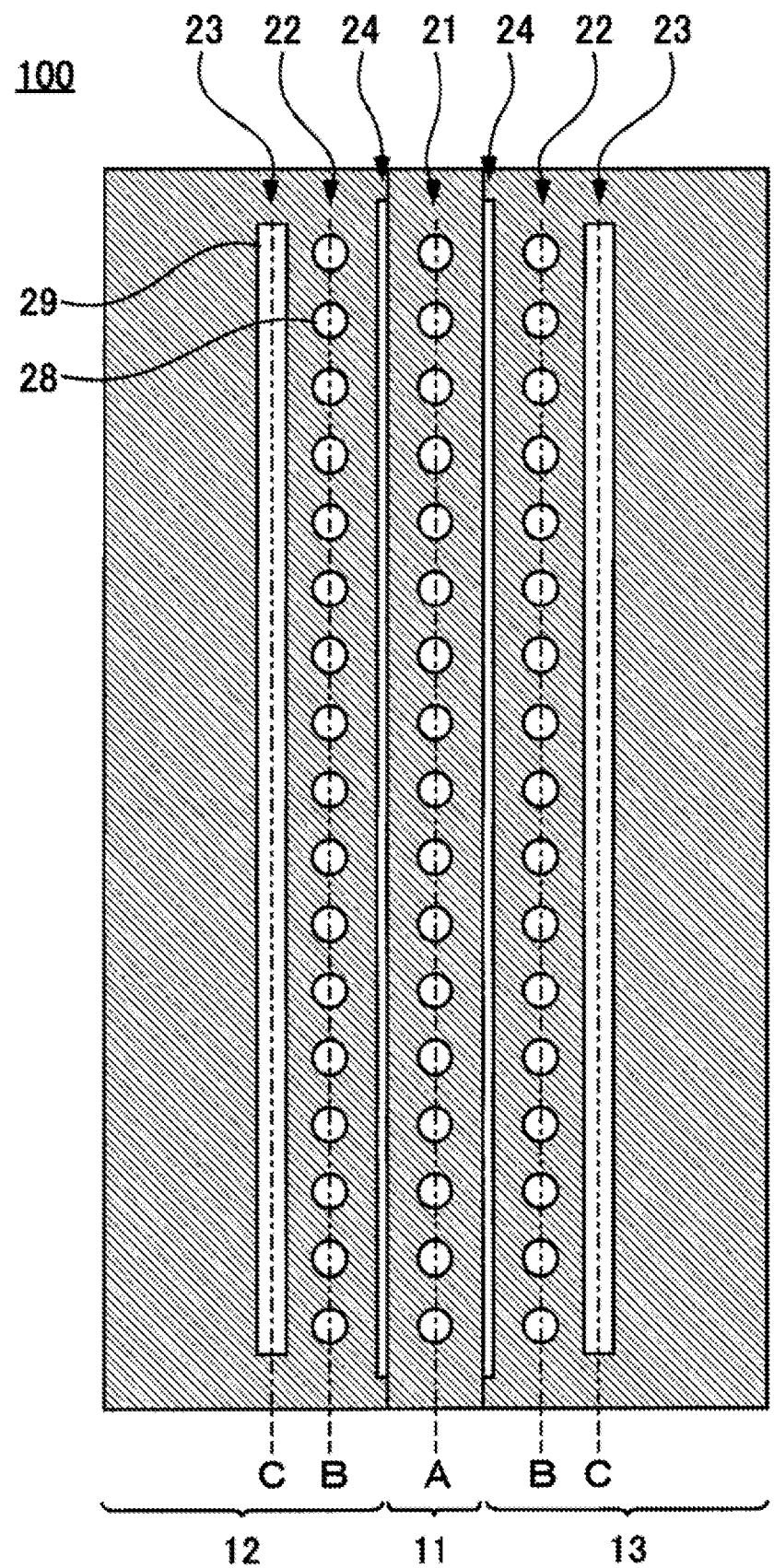
FIG. 2 shows a plan view of the burner for synthesization 100.

FIG. 2 is a plan view of the burner for synthesization 100. Also, FIG. 2 is also a drawing describing an arrangement of the gas injection ports 28, 29 of the burner for synthesization 100.

The raw material gas injection portion 21 includes a plurality of the gas injection ports 28 arrayed along one straight line A. Here, the straight line A is arranged at an approximate center of the burner for synthesization 100 with respect to a direction orthogonal to the straight line A. In other words, each of the gas injection ports 28 is provided in the center block 11 by perforation, for example. To make a plurality of the approximate circular gas injection ports 28 arrayed in a longitudinal direction of the center block 11, each of the gas injection ports 28 has a diameter sufficiently shorter than a dimension of the center block 11 with respect to an array direction of the gas injection ports 28.

The combustion assisting gas injection portion 22 has a plurality of the gas injection ports 28 arrayed along a straight line B that is parallel to the straight line A. Each of the gas injection ports 28 of the combustion assisting gas injection portion 22 is provided in the side blocks 12, 13 by perforation, for example. To make a plurality of approximate circular gas injection ports 28 arrayed in the side blocks 12, 13 in a longitudinal direction, each of the gas injection ports 28 has a diameter sufficiently shorter than the dimensions of the side blocks 12, 13 in an array direction of the gas injection ports 28. Also, the combustion assisting gas injection portions 22 are arrayed in 2 rows, sandwiching the raw material gas injection portion 21, at positions symmetrical to the raw material gas injection portion 21 as a central line.

The combustible gas injection portion 23 has slit-like gas injection ports 29 formed along a straight line C parallel to the straight lines A and B. The gas injection ports 29 of the combustible gas injection portion 23 are formed by perforating the side blocks 12, 13 and are arranged in 2 rows outside the rows of the combustion assisting gas injection portions 22 at positions symmetrical to the raw material gas injection portion 21 as the central line.

The seal gas injection portion 24 has the slit-like gas injection ports 29 parallel to the straight lines A, B and C. The seal gas injection portions 24 are arranged in 2 rows at positions symmetrical to the raw material gas injection portion 21 as the central line. Also, each of the seal gas injection portions 24 is arranged between the row of the gas injection ports 28 of the raw material gas injection portion 21 and the row of the gas injection ports 28 of the combustion assisting gas injection portion 22 and has a slit-like opening thinner than the combustible gas injection portions 23.

Note that in the burner for synthesization 100, the raw material gas injection portion 21 is formed inside the center block 11. Also, the combustion assisting gas injection portions 22 and the combustible gas injection portions 23 are formed inside the side blocks 12, 13. On the other hand, the seal gas injection portions 24 are formed between the center block 11 and the side block 12 and between the center block 11 and the side block 13.

Figure 3:
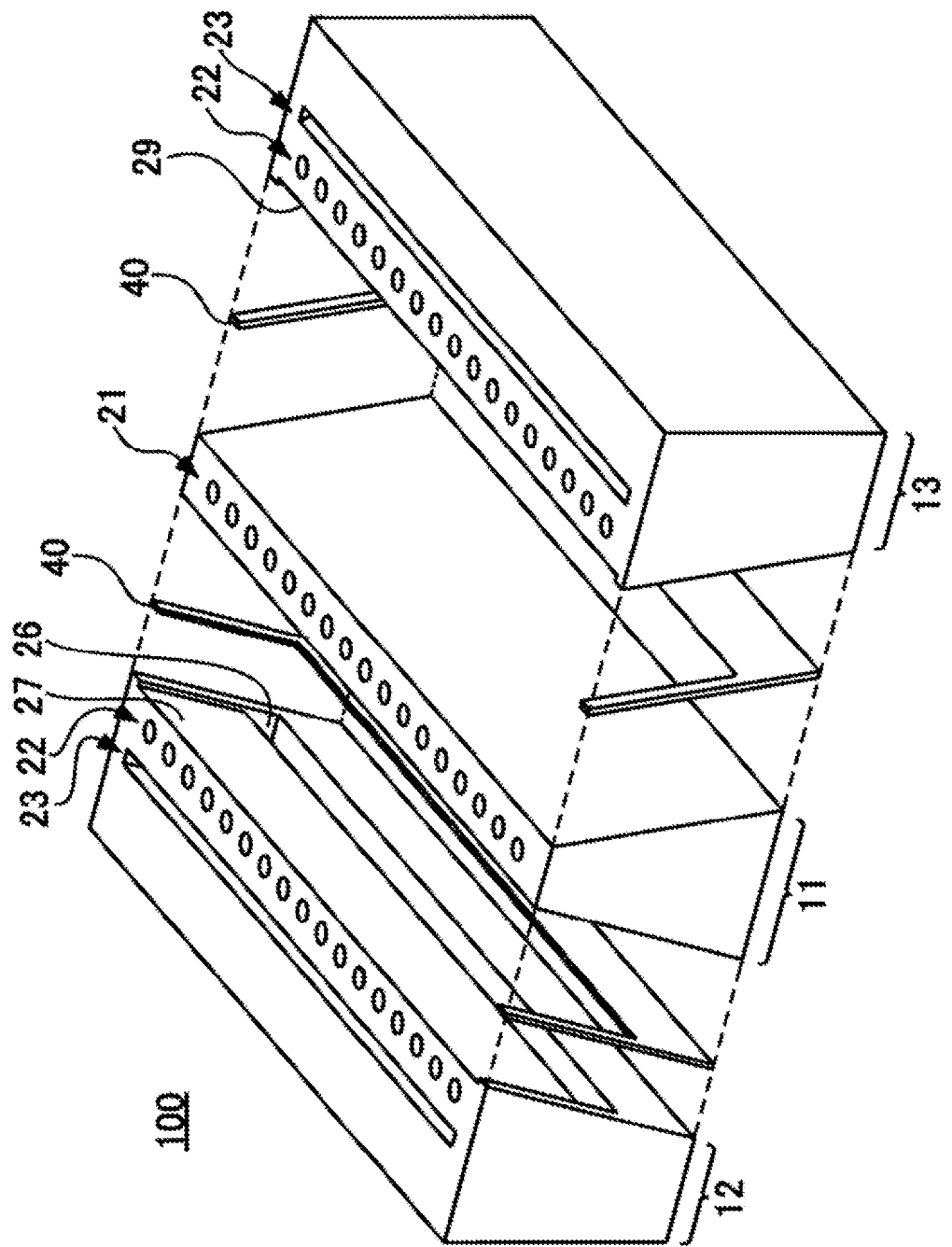
FIG. 3 shows an exploded perspective view of the burner for synthesization 100.

FIG. 3 is an exploded perspective view of the burner for synthesization 100. Also, FIG. 3 is also a drawing describing a structure of the seal gas injection portion 24.

Each of the side blocks 12, 13 has recess portions 26, 27 on a side surface facing the center block 11. The shallow recess portion 27 close to an upper surface in the drawing of each of the side blocks 12, 13 is to be a part of the gas injection ports 29 of the seal gas injection portion 24 in the burner for synthesization 100. Also, the deep recess portion 26 positioned on a lower end in the drawing of the recess portion 27 is to be a part of a buffering portion (refer to FIG. 4) of the seal gas injection portion 24.

By making the side surface of each of the side blocks 12, 13 having the recess portions 26, 27 and a flat side surface of the center block 11 sandwich a gasket 40 and be closely contacted to each other, parts of the seal gas injection portions 24 are formed between the center block 11 and the side block 12 and between the the center block 11 and the side block 13. In this way, the gas injection ports 29 of the seal gas injection portion 24 has a structure formed by machining the side surfaces of the side blocks 12, 13. Accordingly, the gas injection port 29 that injects the seal gas with a small injection amount, that is very elongated if compared to a diameter of the other gas injection port 28 and that is hardly formed by cutting work and the like can be formed easily and securely.

Note that the gasket 40 being a sealing member that seals between the center block 11 and the side block 12 and between the center block 11 and the side block 13 has a shape surrounding the recess portions 26, 27 on the side surfaces of the side blocks 12, 13. Accordingly, unintended unevenness of the center block 11 and the side blocks 12, 13 is absorbed by the gasket 40, and the center block 11 and the side blocks 12, 13 are airtightly and closely contacted to each other at positions other than the upper surface of the burner for synthesization 100. Note that the gasket 40 can be formed by using an expanded graphite sheet such as NICA-FILM (registered trademark) made by Nippon Carbon Co., Ltd. or GRAFOIL (registered trademark) made by GrafTech International Holdings Inc. in U.S.

In other words, if planarity of the surfaces joined to each other in the center block 11 and the side blocks 12, 13 is high, the gasket 40 may also be omitted. Note that because gas with high safety is used as the seal gas, even if some gas is leaked, no safety issue occurs.

The center block 11 and the side blocks 12, 13 as described above are respectively manufactured separately, and then are mutually joined to form the burner for synthesization 100. The center block 11 and the side blocks 12, 13 are pressed against each other and integrally held by a holder that restricts the side surfaces from the outside. The compressed gasket 40 airtightly seals between the center block 11 and the side block 12 and between the center block 11 and the side block 13.

Figure 4:
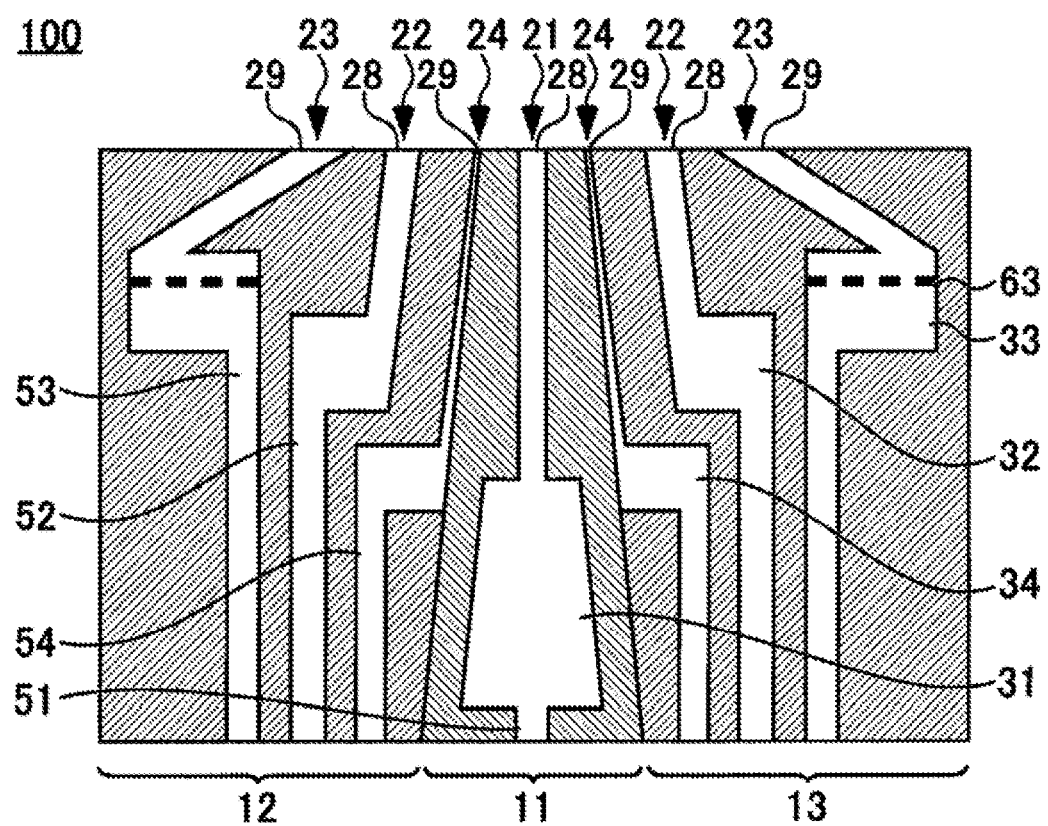
FIG. 4 shows a cross-sectional view of the burner for synthesization 100.

FIG. 4 is a cross-sectional view of the burner for synthesization 100. FIG. 4 shows a cross section of the burner for synthesization 100 on a surface orthogonal to the straight lines A, B and C shown in FIG. 2.

In the burner for synthesization 100, a gas flow path 51 is formed inside the center block 11 by cutting work, and further, a buffering portion 31 that has an inner diameter larger than that of the gas flow path 51 is formed, by cutting work as well, in a part of the gas flow path 51. In a portion upper than the buffering portion 31 in the drawing, the gas flow path 51 extends in a direction approximately orthogonal to a bottom surface and an upper surface of the center block 11.

Gas flow paths 52, 53, 54 are formed inside each of the side blocks 12, 13 by cutting work. Further, in parts of the gas flow paths 52, 53, 54, buffering portions 32, 33, 34 having inner diameters larger than those of the gas flow paths 52, 53, 54 are respectively formed by cutting work. On a further upstream side than the buffering portions 32, 33, 34, that is, on a lower side of the drawing, the gas flow paths 52, 53, 54 extend in a direction approximately orthogonal to the bottom surfaces of the side blocks 12, 13.

Note that a number of openings, that is, a number of gas introducing ports, of each of the gas flow paths 52, 53, 54 in the bottom surfaces of the center block 11 and the side blocks 12, 13 may also be one with respect to each of the raw material gas injection portion 21, the combustion assisting gas injection portions 22, the combustible gas injection portions 23 and the seal gas injection portions 24, or a plurality of the openings may also be provided. Also, the respective gas introducing ports of the raw material gas injection portion 21, the combustion assisting gas injection portions 22, the combustible gas injection portions 23 and the seal gas injection portions 24 may also be different from each other in the shapes, the cross-sectional areas, the quantities, the arrangements and the like in accordance with the gas flow rate and the like.

On the other hand, in each of the side blocks 12, 13, the gas flow path 52 extends tiltingly so that the more the gas flow path 52 approaches on the downstream side of the buffering portion 32, that is, the gas injection port 28 of the combustion assisting gas injection portions 22 on the upper side in the drawing, the closer the gas flow path 52 is to the gas injection port 28 of the raw material gas injection portion 21. Accordingly, the combustible gas injected from the gas injection port 28 of the combustion assisting gas injection portion 22 is injected in a direction in which the combustible gas is merged with the raw material gas injected from the gas injection port 28 of the raw material gas injection portion 21.

Also, the gas flow path 53 in each of the side blocks 12, 13 extends tiltingly so that the more the gas flow path 53 approaches the downstream side of the buffering portion 33, that is, the gas injection port 29 on the upper side in the drawing, the closer the gas flow path 53 is to the gas injection port 28 of the raw material gas injection portion 21. Further, the upper side portion of the gas flow path 53 is tilted more strongly than the upper side portion of the gas flow path 52. Accordingly, the combustible gas injected from the gas injection port 29 of the combustion assisting gas injection portion 22 is injected in a direction in which the combustible gas is merged with both of the combustion assisting gas injected from the gas injection port 28 of the combustion assisting gas injection portion 22 and the raw material gas injected from the gas injection port 28 of the raw material gas injection portion 21.

Further, in each of the side blocks 12, 13, a gas flow path 54 following the gas injection port 29 is formed by the downstream side of the buffering portion 34, that is, the center block 11 and the side blocks 12, 13 on the upper side in the drawing. The injection directions of the raw material gas, the combustion assisting gas and the combustible gas from the gas injection ports 28, 29 are described later with reference to FIG. 5.

The gas flow paths 51, 52, 53, 54 supply various gas supplied from the outside to the gas injection ports 28, 29 in the burner for synthesization 100. On the midways of the gas flow paths 51, 52, 53, 54, the buffering portions 31, 32, 33, 34 are respectively formed. Note that shapes of the buffering portions 31, 32, 33, 34 may also be shapes respectively having a polygonal cross section as shown, or may also be shapes respectively combining a curved surface without an angle.

In the buffering portions 31, 32, 33, 34, the cross-sectional areas of the gas flow paths 51, 52, 53, 54 drastically become large. Accordingly, residence time of the gas, which flew into the gas flow paths 51, 52, 53, 54, in the buffering portions 31, 32, 33, 34 is set long to relax an inner pressure distribution.

Accordingly, even if the cross-section shapes, the numbers, the areas and the like of the gas flow paths 52, 53, 54 on gas introduction side and on gas injection side with respect to the burner for synthesization 100 are different from each other, the flow velocity distribution of the injected gas is uniform in a longitudinal direction of the burner (a direction orthogonal to a paper surface in FIG. 4), and a porous glass base material uniform in the longitudinal direction can be manufactured. Also, by providing the buffering portions 31, 32, 33, 34, pulsation of the gas flowing through the gas flow paths 51, 52, 53, 54 can also be mitigated to stabilize the flow velocity of the raw material gas.

Further, in the burner for synthesization 100, the buffering portion 33 of the combustible gas injection portion 23 is provided with a pressure loss exerting portion 63. The pressure loss exerting portion 63 is formed, in an inlet of the buffering portion 33, of a porous medium, a mesh material and the like arranged further downstream than a position at which the cross-sectional area of the gas flow path 53 is expanded, so as to reduce an effective cross-sectional area of the gas flow path 53 and to increase the inner pressure of the gas in the gas flow path 53 to make the residence time of the gas long. Accordingly, the pressure loss exerting portion 63 can improve an in-plane uniformity of the flow rate of the gas flowing further downstream than the pressure loss exerting portion 63, and can make the flow velocity distribution of the gas injected from the gas injection portion uniformized. Also, by providing the pressure loss exerting portion 63, the pulsation of the gas flowing through the gas flow path 53 can also be mitigated to stabilize the flow velocity of the gas.

Note that in the burner for synthesization 100, the pressure loss exerting portion 63 is not provided on the other gas flow paths 51, 52 and 54. However, because the gas injection ports 28 communicate with the other gas flow paths 51, 52 and 54 have a plurality of openings having small diameters, the same effect as that of the reducing the effective cross-sectional areas of the gas flow paths 51, 52 and 54 can be obtained by the gas injection ports. However, certainly, these gas flow paths 51, 52 and 54 may also be further respectively provided with the pressure loss exerting portion 63.

Figure 5:
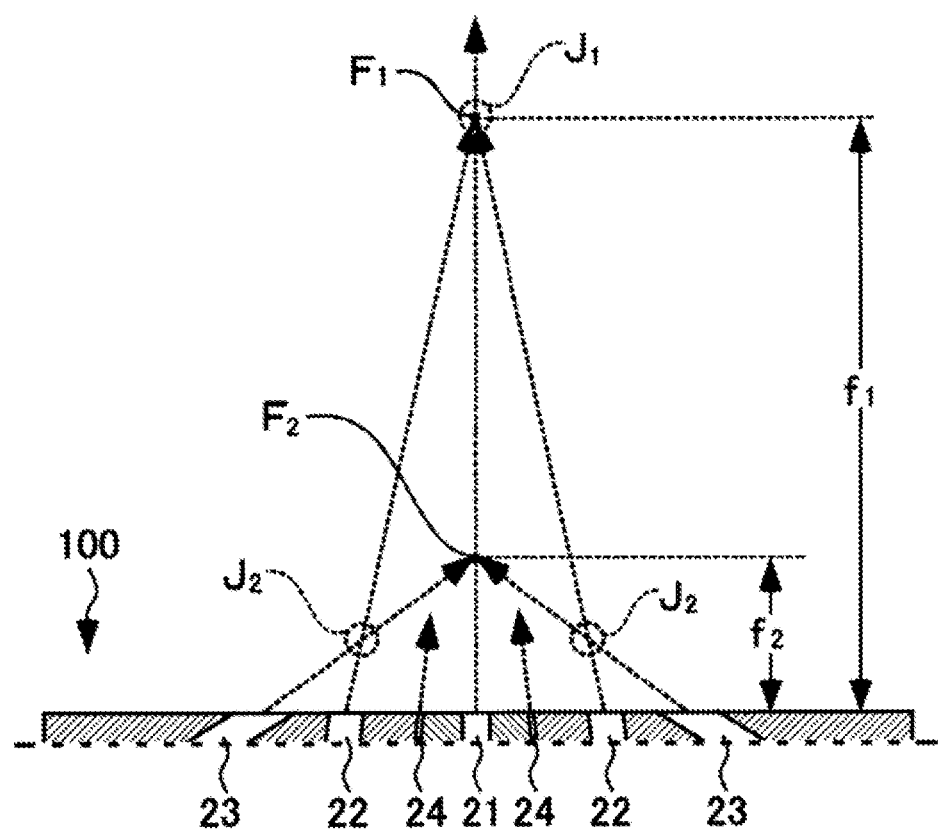
FIG. 5 describes an injection direction of gas in the burner for synthesization 100.

FIG. 5 is a schematic diagram describing directions in which the burner for synthesization 100 injects the gas. The raw material gas injected from the raw material gas injection portion 21 is injected in an approximately vertical direction from the lower side to the upper side in the drawing.

Because the raw material gas injection portion 21 is formed by the plurality of the gas injection ports 28 having small diameters arranged in parallel, as already described, the injection direction of the raw material gas in the longitudinal direction is stable.

The combustion assisting gas injection portions 22 have the gas flow paths 52 tilted on the gas injection port 28 side, and are arranged symmetrically with respect to the gas injection port 28 of the raw material gas injection portion 21 as a center. Accordingly, the combustion assisting gas injection portion 22 injects, symmetrically bilaterally in the drawing, the combustion assisting gas in a direction in which the combustion assisting gas is merged with the gas flow of the raw material gas injected by the raw material gas injection portion 21.

The combustion assisting gas injected by the combustion assisting gas injection portion 22 is injected toward a focus $F_1$ on the gas flow of the raw material gas, and is merged with the raw material gas flow at a merging point $J_1$ near the focus $F_1$. Accordingly, in the burner for synthesization 100, the raw material gas and the combustion assisting gas are efficiently mixed. Note that a distance from the surface of the burner for synthesization 100 to the focus $F_1$ of the combustion assisting gas flow is called a "focal distance $f_1$" for convenience.

Also, the combustible gas injection portions 23 have the gas flow paths 53 tilted on the gas injection port 29 side, and are arranged the outside the combustion assisting gas injection portion 22 symmetrically with respect to the gas injection port 28 of the raw material gas injection portion 21 as the center. Accordingly, the combustible gas injection portion 23 injects the combustible gas symmetrically bilaterally in the drawing in a direction in which the combustible gas is merged with the combustion assisting gas flow injected by the gas injection port 28 of the combustion assisting gas injection portion 22, the direction in which further the combustible gas is merged with the raw material gas flow injected by the gas injection port 28 of the raw material gas injection portion 21.

However, the combustible gas injected by the combustible gas injection portion 23 is injected in a direction which is on the gas flow of the raw material gas and in which the combustible gas is converged at a focus $F_2$ that is closer to the burner for synthesization 100 than the focus $F_1$ of the gas flow of the combustion assisting gas. Accordingly, the combustible gas is merged with the gas flow of the combustion assisting gas at a merging point $J_2$ that is positioned closer to the burner for synthesization 100 than the merging point $J_1$ at which the gas flow of the combustion assisting gas is merged with the gas flow of the raw material gas. In other words, in the burner for synthesization 100, before the gas flow of the combustion assisting gas is merged with the gas flow of the raw material gas, the gas flow of the combustion assisting gas and the gas flow of the combustible gas are merged with each other on the upstream side.

For example, if the combustible gas is hydrogen, because oxyhydrogen flame is generated at a moment when the combustible gas is mixed with the combustion assisting gas, in the burner for synthesization 100, the combustion assisting gas and the combustible gas are merged with the raw material gas as the oxyhydrogen flame. Note that a distance from the surface of the burner for synthesization 100 to the focus $F_2$ of the combustible gas flow is called a "focal distance $f_2$" for convenience.

Note that in the burner for synthesization 100, during the process in which the gas flow of the combustion assisting gas is merged with the gas flow of the raw material gas, the gas flow of the combustion assisting gas may be pushed by the gas flow of the combustible gas, and the flow path of the gas flow of the combustion assisting gas may become close to the gas flow of the raw material gas. Also, due to a difference of the flow velocity and the like between the gas flow of the raw material gas and the gas flow of the combustion assisting gas, the gas flow of the combustion assisting gas may also be sucked by the gas flow of the raw material gas. For this reason, the flow path of the gas flow of the combustion assisting gas is not limited to a straight-line shape as shown in the drawing.

According to the reason as described above, even if the raw material gas and the combustion assisting gas are injected in parallel from the burner for synthesization 100, the gas flow of the raw material gas and the gas flow of the combustion assisting gas can be merged with each other. Similarly, in the burner for synthesization 100, even if the gas flow of the combustible gas and the gas flow of the combustion assisting gas are injected in parallel from the burner for synthesization 100, the gas flow of the combustion assisting gas and the gas flow of the combustible gas can be merged with each other.

Also, because the gas injection port 29 of the combustible gas injection portion 23 has the slit opening, the injection direction of the combustible gas is not as stable as that of the combustion assisting gas. However, because a negative pressure is generated on the periphery of the combustion assisting gas flow injected from the plurality of the gas injection ports 28, the combustible gas is sucked and an efficient mixture is facilitated. Accordingly, combustion of the combustible gas and reactivity when synthesizing the glass particles are improved.

Further, according to the injection direction of the gas as described above, the gas flow of the combustion assisting gas injected from the combustion assisting gas injection portion 22 is pushed toward a direction approaching the gas flow of the raw material gas by the gas flow of the combustible gas injected from the combustible gas injection portion 23. Accordingly, even if the combustion assisting gas injection portion 22 injects the combustion assisting gas approximately in parallel with the gas flow of the raw material gas, as a result, the injection direction becomes the injection direction in which the combustion assisting gas is merged with the raw material gas as described above.

Also, in addition, in the burner for synthesization 100, because the combustion assisting gas and the combustible gas are blown and gathered from both sides of the raw material gas, in the raw material gas injection portion 21, a structure to inject the gas from the slit-like gas injection port 29 formed along the straight line A may also be set. Accordingly, a machining amount when manufacturing the center block 11 can be reduced.

The seal gas injection portion 24 injects the seal gas between the raw material gas injection portion 21 and the combustion assisting gas injection portion 22. However, because an injection amount of the seal gas of the seal gas injection portion 24 is small, an influence further than that the raw material gas is prevented from being reacted in the proximity of the burner for synthesization 100 does not occur.

Also, in the above-described example, on the sides of the single raw material gas injection portion 21, a pair of the combustion assisting gas injection portions 22 and a pair of the combustible gas injection portions 23 are respectively arranged symmetrically. However, for example, a single combustion assisting gas injection portion 22 and a single combustible gas injection portion 23 can also be respectively used or the numbers of the combustion assisting gas injection portions 22 and of the combustible gas injection portions 23 can also be respectively increased to three or more to form the burner for synthesization 100.

As described above, in the burner for synthesization 100, by making the focal distance $f_2$ of the combustible gas injection portion 23 shorter than the focal distance $f_1$ of the combustion assisting gas injection portion 22, mixing property of the gas is improved, and the direction of the flame including the synthesized glass particles is stabilized. Accordingly, adhesion efficiency with respect to the target of the glass particles is improved.

Also, by making the focal distance $f_2$ of the combustible gas injection portion 23 short, when combustible gas having high diffusibility, for example, hydrogen gas is used, that the combustible gas dissipates without reacting with the combustion assisting gas, and reacts with oxygen in the ambient air is prevented. Accordingly, utilization efficiency of the combustible gas can be improved.

EMBODIMENT

Figure 6:
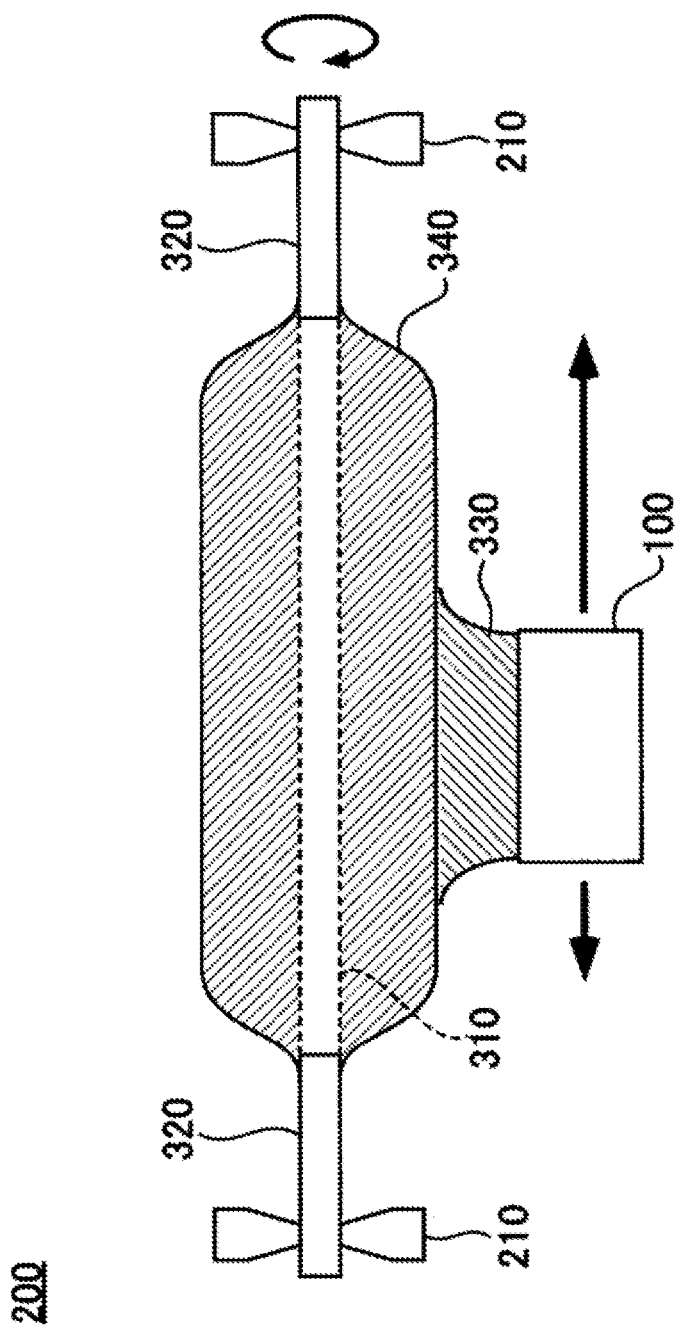
FIG. 6 shows a schematic diagram of a manufacturing apparatus 200 to manufacture a porous glass base material 340.

FIG. 6 is a schematic diagram showing a structure of a manufacturing apparatus 200 manufacturing a porous glass base material 340. The manufacturing apparatus 200 includes a burner for synthesization 100 and a pair of chucks 210.

The burner for synthesization 100 is arranged between the pair of chucks 210 that are facing each other. The pair of chucks 210 hold a long rod material by both ends to keep the rod material horizontal, and rotate the held rod material around a center axis of the rod material as a rotation axis.

The burner for synthesization 100 is arranged so that a longitudinal direction of the burner for synthesization 100 itself matches a longitudinal direction of the rod material held by the pair of chucks 210, and reciprocatingly moves in the longitudinal direction of the rod material as shown by the arrows in the drawing.

When manufacturing the porous glass base material 340, first, a pair of dummy rods 320 are welded to both ends of a glass rod as a target 310, and the welded dummy rods 320 are held by the chucks 210. Accordingly, a surface of the target 310 is exposed over the entire length between the chucks 210.

Next, while rotating the target 310 by the chucks 210, the ignited burner for synthesization 100 is reciprocatingly moved in parallel with the longitudinal direction of the target 310. Accordingly, the glass particles synthesized by the burner for synthesization 100 are adhered to the target 310 and the porous glass base material 340 is formed.

As one example of manufacturing the porous glass base material 340, the burner for synthesization 100 injected the gas as described below to synthesize the glass particles. From the raw material gas injection portion 21, silicon tetrachloride gas as the raw material gas was injected at a flow rate of 15 L/min. From the combustion assisting gas injection portion 22, oxygen gas as the combustion assisting gas was injected at a flow rate of 130 L/min. From the combustible gas injection portion 23, hydrogen gas as the combustible gas was injected at a flow rate of 300 L/min. Further, from the seal gas injection portion 24, nitrogen gas as the seal gas was injected at a flow rate of 10 L/min.

Further, from the raw material gas injection portion (21), oxygen gas as the accompanying gas was injected at 20 L/min along with the raw material gas. Also, the combustion assisting gas injection portion 22 injected the combustion assisting gas in a direction in which the focal distance $f_1$ of the combustion assisting gas flow is to be 30 mm, and the combustible gas injection portion 23 injected the combustible gas in a direction in which the focal distance $f_2$ of the combustible gas flow is to be 6 mm.

In the way as described above, the porous glass base material 340 having a diameter of 300 mm was manufactured. In this case, the adhesion efficiency of the glass particles was 70%.

COMPARATIVE EXAMPLE 1

Figure 7:
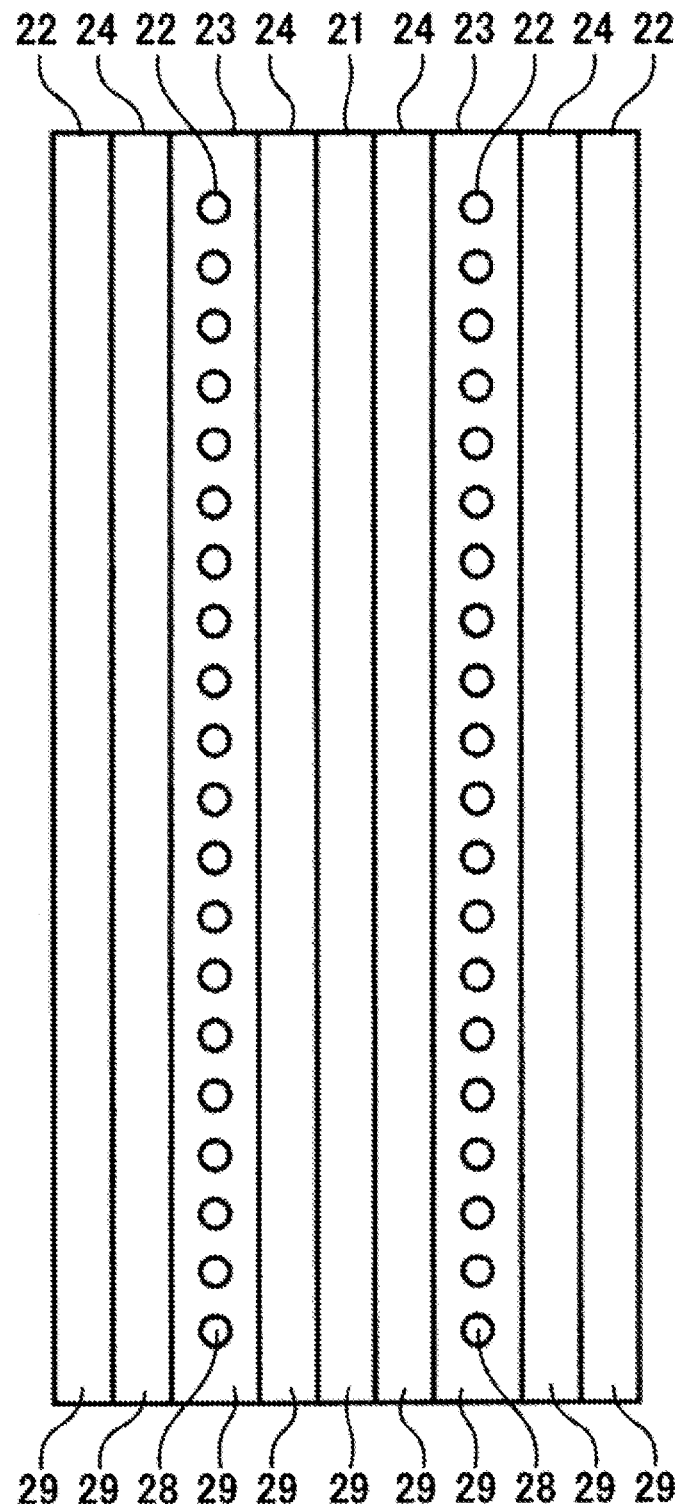
FIG. 7 shows a plan view of a burner for synthesization 101 according to a comparative example.

FIG. 7 is a plan view of a burner for synthesization 101 according to a comparative example. In the burner for synthesization 101, as shown by the reference numbers on the upper portion in the drawing, the raw material gas injection portion 21 in a center of a width direction is set as a center, and the seal gas injection portion 24, the combustible gas injection portion 23, the seal gas injection portion 24 and the combustion assisting gas injection portion 22 are sequentially arranged. All of these gas injection portions respectively have the gas injection port 29 having a slit-like opening, as shown by the reference numbers on the lower portion in the drawing.

Further, the burner for synthesization 101 is further provided with the combustion assisting gas injection portion 22 having a plurality of the gas injection ports 28 with small diameters on the inner side of the gas injection port 29 of the combustible gas injection portion 23. Also, although the illustration is omitted, each of the raw material gas injection portion 21, the combustion assisting gas injection portion 22, the combustible gas injection portion 23 and the seal gas injection portion 24 is provided with a uniformizing structure to uniformly supply the gas to the slit-like gas injection port 29.

Figure 8:
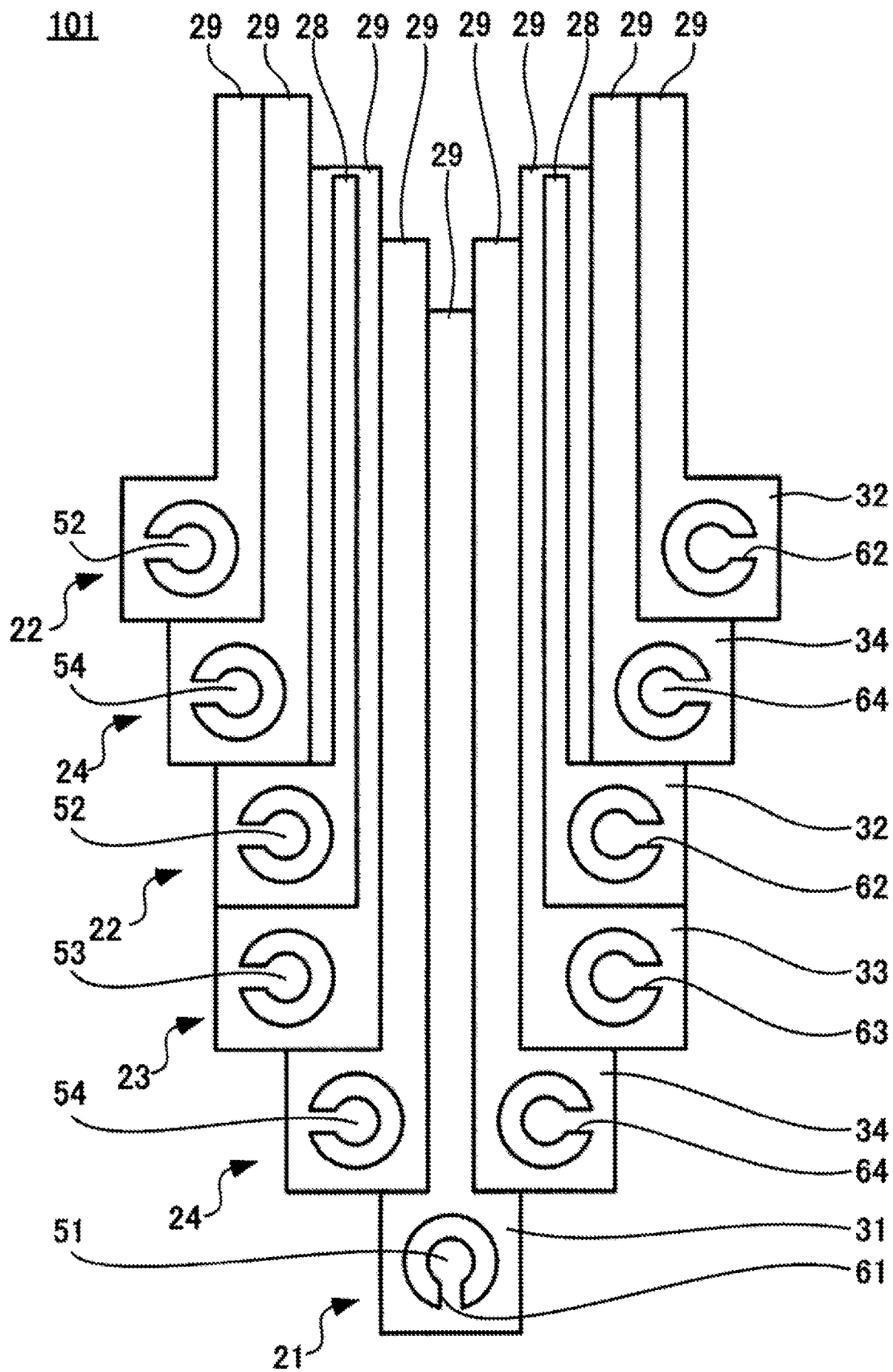
FIG. 8 shows a schematic cross-sectional view of the burner for synthesization 101 according to the comparative example.

FIG. 8 is a drawing schematically showing a structure of the burner for synthesization 101. As shown in the drawing, the burner for synthesization 101 includes the gas injection ports 29 and the buffering portions 31, 32, 33, 34 which are formed of plate materials, and the gas injection ports 28, the gas flow paths 51, 52, 53, 54 and the pressure loss exerting portions 61, 62, 63, 64 which are formed of tube materials. Accordingly, the burner for synthesization 101 is set to be capable of synthesizing the glass particles by the stabilized flame and of causing the synthesized fine particles to be efficiently adhered to the target.

The burner for synthesization 101 according to this comparative example is manufactured by using, as the materials, a plurality of glass tubes to be the gas injection ports 28 having small diameters, glass tubes to be the gas introducing portion having perforated holes in side surfaces as the pressure loss exerting portions 61, 62, 63, 64, and glass plates to be the gas injection ports 29 and the buffering portions 31, 32, 33, 34. Also, these various materials are integrated by mutually welding.

By using the above-described burner for synthesization 101, the porous glass base material was manufactured. In the used burner for synthesization 101, silicon tetrachloride gas as the raw material gas at 15 L/min from the raw material gas injection portion 21, oxygen gas as the combustion assisting gas at 30 L/min from the combustion assisting gas injection portions 22 having the gas injection ports 28, oxygen gas at 90 L/min from the combustion assisting gas injection portion 22 having the gas injection ports 29, hydrogen gas as the combustible gas at 400 L/min from the combustible gas injection portion 23, and nitrogen gas as the seal gas at 10 L/min from each of the seal gas injection portions 24 were respectively injected. Also, from the raw material gas injection portion 21, oxygen gas as accompanying gas at 30 L/min was injected along with the raw material gas.

Using a glass rod having a diameter of 100 mm as the target, when the glass particles synthesized by the burner for synthesization 101 were deposited on the periphery of the glass rod, the adhesion efficiency of the glass particles was 66%.

As described above, because the structure and the manufacturing process of the burner for synthesization 101 are complicated, manufacturing costs of the burner for synthesization 101 itself can necessarily be high. Also, the characteristics as the burner for synthesization 101 change in accordance with the material machining and welding conditions during the manufacturing process of the burner for synthesization 101 itself, and a large variation in density of the porous glass base material manufactured by using the burner for synthesization 101 occurs. For this reason, when using the burner for synthesization 101, in addition to the increase of the equipment cost, a product yield is lowered.

On the other hand, because the burner for synthesization 100 according to the embodiment can perform the cutting work on the bulk member of quartz by an NC machine tool to manufacture products, quality of the burner for synthesization 100 itself is stable. Also, because the performance of the burner for synthesization 100 is stable, the porous glass base materials having mutually equivalent quality can be manufactured with a high yield. Further, as showing the adhesion efficiency higher than that of the burner for synthesization 101 of the comparative example, the productivity of the porous glass base material by the burner for synthesization 100 according to the embodiment is not lowered.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A burner for synthesization to synthesize glass particles that form a porous glass base material, the burner for synthesization comprising:
   a raw material gas injection portion to inject raw material gas in a direction toward a target;
   an inner injection portion to inject one of combustion assisting gas and combustible gas in a direction toward a first merging point; and
   an outer injection portion to inject the other of combustion assisting gas and combustible gas in a direction toward a second merging point that is positioned closer to the inner injection portion than the first merging point, wherein
   the injection direction of each of the inner injection portion and the outer injection portion is tilted toward the injection direction of the raw material gas injection portion,
   the outer injection portion is positioned further from the raw material gas injection portion than the inner injection portion and the injection direction of the outer injection portion is tilted more strongly toward the injection direction of the raw material gas injection portion than the injection direction of the inner injection portion,
   the first merging point is an intersection between an axis extending from the raw material gas injection portion in the injection direction thereof and an axis extending from the inner injection portion in the injection direction thereof, and
   the second merging point is an intersection between an axis extending from the inner injection portion in the injection direction thereof and an axis extending from the outer injection portion in the injection direction thereof.

2. The burner for synthesization according to claim 1, wherein
   the outer injection portion is a combustible gas injection portion,
   the inner injection portion is a combustion assisting gas injection portion, and
   the combustible gas injection portion is arranged adjacent to the combustion assisting gas injection portion such that there is no other gas injection portion between the the combustible gas injection portion and the combustion assisting gas injection portion.

3. The burner for synthesization according to claim 2, wherein
   The combustion assisting gas injection portion includes a plurality of injection ports arranged along one straight line.

4. The burner for synthesization according to claim 3, wherein
   the raw material gas injection portion includes a plurality of injection ports arranged along a straight line parallel to the one straight line.

5. The burner for synthesization according to claim 3, wherein
   the raw material gas injection portion includes a slit-like opening formed along a straight line parallel to the one straight line.

6. The burner for synthesization according to claim 3, wherein
   the combustible gas injection portion includes a slit-like opening parallel to the one straight line.

7. The burner for synthesization according to claim 2, comprising:
   a first bulk member including the raw material gas injection portion; and
   a second bulk member being arranged adjacent to the first bulk member and including the combustion assisting gas injection portion, wherein
   the first bulk member communicates with the raw material gas injection portion and is provided with a gas flow path through which the raw material gas flows, and the second bulk member communicates with the combustion assisting gas injection portion and is provided with a gas flow path through which the combustion assisting gas flows.

8. The burner for synthesization according to claim 7, wherein
   the second bulk member communicates with the combustible gas injection portion and is further provided with a gas flow path through which the combustible gas flows.

9. The burner for synthesization according to claim 8, wherein
   the gas flow path includes a buffering portion to mitigate pulsation of gas that passes through the gas flow path.

10. The burner for synthesization according to claim 9, wherein
    the gas flow path further includes a pressure loss exerting portion that is arranged either inside the buffering portion or further downstream than the buffering portion and that mitigates the pulsation of the gas that passes through the gas flow path.

11. The burner for synthesization according to claim 2, further comprising:
    a seal gas injection portion, between the raw material gas injection portion and the combustion assisting gas injection portion, to inject seal gas that seals the raw material gas.

12. The burner for synthesization according to claim 11, wherein
    the seal gas injection portion includes a slit-like opening parallel to an array direction of the combustion assisting gas injection portion.

13. The burner for synthesization according to claim 11, wherein
    the seal gas injection portion is formed between one bulk member and another bulk member.

14. The burner for synthesization according to claim 13, comprising:
    a sealing member to airtightly seal a part between the one bulk member and the other bulk member.

15. The burner for synthesization according to claim 1, wherein
- the raw material gas injection portion, the inner injection portion, and the outer injection portion are joined to form a rectangular parallelepiped shape,
- the raw material gas injection portion includes a plurality of injection ports arranged along a first straight line,
- the inner injection portion includes a plurality of injection ports arranged along at least one second straight line parallel to the first straight line, and
- the outer injection portion includes a plurality of injection ports arranged along at least one third straight line parallel to the first straight line.

* * * * *